6655X
T. Woolson,
Cook Stove.
Patented July 20 1831.
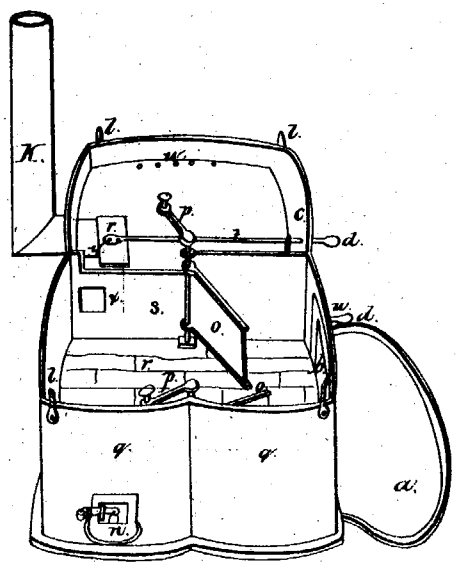
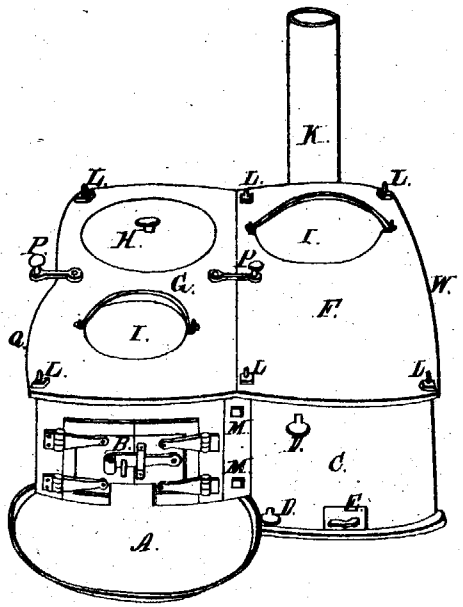

July 20. 1831 85

6655X Thomas Woolson's Cooking Stove
Letters Patent

The Schedule referred to in these Letters Patent and making part
of the same containing a description in the words of the said Thomas
Woolson himself of his Improvement in the Cooking Stove.

---

To all to whom these Presents shall come
Be it known that I Thomas Woolson of Claremont in the County of
Sullivan and State of New Hampshire have invented and construct-
ed a new and useful improvement in domestic economy, which I de-
nominate a <u>Double Horizontal Cooking Stove</u> and that the following
is a full and exact description of the said Stove as invented and employ-
ed by me. The Stove is usually constructed partly of cast, and partly of
sheet iron, but may be built wholly of either as convenience may dic-
tate. The form of the stove resembles that of two oblong stoves, the ends
and sides moderately curved, placed one beside the other, so connected
as to form one stove, between the two parts is a straight cast iron division
plate, which constitutes the inner side of both sections of the stove.
The Stove described is No. 1, the largest contemplated, but different
sizes will be built to suit different families. The height of this Stove
is 14 inches throughout, on the left of the division plate is situated
the fire place 16 inches wide on the front side, where the fire doors are sit-
uated, which open from the centre, to the right and left. On a level with
the bottom of the doors, a hearth projects about one foot and extends from
right to left about 22 inches. It is screwed to the door frame 2 inches
above the bottom of the stove, a course of bricks being laid in the stove
where the fire is kept, brings the surface on which the fire lies to a level
with the hearth, which rests on the projecting end of an iron bar which
attaches to the frame on which the stove stands: from the fire doors to the
back side of the stove is 20 inches which is the length of the fire place;
the plate on the left side of the fire place, which is called the fire end
of the stove, is formed by two curves thus  the frame which holds
the 6655x July 20, 1831 the fire door is made fast by bolts to the division plate on the right
and to the fire end plate at figure 3 on the left. On the back side oppo-
site the fire door is a curved plate of equal size to the door frame, made
fast to the fire end plate at figure 1, and to the division plate at the
other end by bolts. To the centre of the fire end plate at fig 2 is hung
a small cast iron plate with one pivot resting on a knob in the end
plate about 3 inches from the lower side of said plate and one pivot
extending through the top of the stove by which it may be swung round;
opposite to this, on the division plate another similar plate is hung in
the same way; when these plates are swung together they meet in the
centre and form the fire place into two nearly equal parts, over each
of which circular holes are formed in the top of the stove for the admis-
sion of vessels for boiling and other culinary purposes. Through the fire
end plate between fig 1 and 2, a door is made for the purpose of kind-
ling a fire under the back kettle when the moveable plates are swung to-
gether, so as to make two parts of the fire place, the moveable plates
come within 2 inches of the top of the stove, which leaves room for the smoke
from the fire in the front apartment to pass over them to the funnel. The
object of the moveable plates is to enable the occupier to heat one ves-
sel at a time when necessary, thereby to save fuel and not occasion
so much heat during the warm season of the year; when it is neces-
sary to heat both vessels at once or a large fire is convenient, the plate
which is hung at fig 2 on the end plate may be turned to fig 1 or 3 and
the other plate turned to the division plate, thereby forming one long
fire place; it is intended that these moveable plates should be taken
out of the stove in the winter season. The section of the stove to the
right of the division plate contains the oven and is constructed as
follows. The shape and size of the oven part are similar to that on the
left except that the oven end plate consists of one curve of a larger
sweep instead of the two small curves as in the fire end plate, the oven
is usually made of sheet iron by itself, nine inches deep and broad
enough to reach from the division plate to the end plates, the back side of
the oven is confined between two cleats on the division plate and made
fast fast with rivets to the end plate through which is the oven's mouth and
on which the oven's door is hung. The oven being but nine inches deep
and twenty four inches wide and being placed midway between the
top and bottom of the stove and between the back and front plates gives
the smoke room to play completely round the oven when required for
heating it. The smoke is let out on the back side of the stove against
the oven by a funnel seven inches in diameter, the division plate is cut out
from the top plate as low as the top of the oven about one half its length on
the back part in order to let the smoke pass round the oven and thence out
at the funnel on the back side, whereby the oven is heated: through the divis-
ion plate a hole is made three inches wide and four high just back of the oven
and below the top of the oven: against which a strong damper is hung which
is opened and shut at pleasure by means of a rod connected therewith and
extending under the oven and through the front side of the stove near the
hearth. The space between the upper side of the oven and the back plate
of the stove is closed with a plate of iron except an aperture three inches
wide and six inches long from the division plate to the right, which aper-
ture is closed with a horizontal damper which slides on the top of the
oven by means of a rod extending over the oven and through the front plate
4 or 5 inches to the right of the division plate: by means of these dampers
the heat of the oven can be regulated to any degree required, for it will be
readily seen that when both dampers are open the blaze and smoke pass
directly into the funnel without going round the oven; and when both are
closed all the blaze and smoke has to pass round the oven, thus by ad-
justing the dampers, the whole or any part of the heat may be turned round
the oven till the heat suits the occasion. The top of the stove consists of
two cast iron plates rivetted together over the division plate; the
plate which covers the fire place has two round openings for boilers cov-
ered with circles to receive different sized vessels, the plate over the oven
has one opening for frying near the funnel. What I claim as origin-
al is the following viz. Placing the two parts of the stove, to wit, that
which contains the fire and that containing the oven horizontally side
by side, thereby communicating heat to one side of the oven; the partition or 6655x July 20, 1831 method of turning the blaze and smoke around the oven as described, giving heat to the top and bottom and to the front and back sides, leaving but one side exposed to the air, viz. where the oven door is hung; also the particular method of letting the blaze &c into the funnel without passing round the oven by opening the dampers, thus regulating not only the heat of the oven, but in a considerable degree the draught of the stove, and heat communicated to the room, and also the particular method, described, of making the fire place into two parts or one, by means of the moveable plates hung therein Thomas Woolson Exd. Witnesses
[illegible] Samuel Seward Jr.
[illegible] M. Seward 1475 [illegible]